(12) United States Patent
Ushiku et al.

(10) Patent No.: US 6,944,572 B2
(45) Date of Patent: Sep. 13, 2005

(54) APPARATUS FOR PREDICTING LIFE OF ROTARY MACHINE AND EQUIPMENT USING THE SAME

(75) Inventors: Yukihiro Ushiku, Yokohama (JP); Tsunetoshi Arikado, Tokyo (JP); Shuichi Samata, Yokohama (JP); Takashi Nakao, Kawasaki (JP); Yuuichi Mikata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/752,816

(22) Filed: Jan. 8, 2004

(65) Prior Publication Data

US 2004/0143418 A1 Jul. 22, 2004

Related U.S. Application Data

(63) Continuation of application No. 10/101,720, filed on Mar. 21, 2002, now Pat. No. 6,865,513.

(30) Foreign Application Priority Data

Mar. 23, 2001 (JP) ........................................ P2001-85736

(51) Int. Cl.[7] ............................................. G06F 101/21
(52) U.S. Cl. ..................... 702/181; 702/184; 702/34; 702/179; 702/182; 702/183; 702/185; 714/31
(58) Field of Search ................................. 702/181, 184, 702/34, 179, 182, 183, 185; 714/31

(56) References Cited

U.S. PATENT DOCUMENTS

| | | |
|---|---|---|
| 5,210,704 A | 5/1993 | Husseiny |
| 5,406,502 A | 4/1995 | Haramaty et al. |
| 5,610,339 A | 3/1997 | Haseley et al. |
| 5,710,723 A | 1/1998 | Hoth et al. |
| 6,208,953 B1 | 3/2001 | Milek et al. |
| 6,226,597 B1 | 5/2001 | Eastman et al. |
| 6,260,004 B1 | 7/2001 | Hays et al. |
| 6,619,111 B2 | 9/2003 | Soneda et al. |

FOREIGN PATENT DOCUMENTS

| | | |
|---|---|---|
| JP | 5-195980 | 8/1993 |
| JP | 08-055145 | 2/1996 |
| JP | 8-261886 | 10/1996 |
| JP | 09-189290 | 7/1997 |
| JP | 10-228309 | 8/1998 |
| JP | 10-335193 | 12/1998 |
| JP | 11-070445 | 3/1999 |
| JP | 11-288856 | 10/1999 |
| JP | 2000-283056 | 10/2000 |

OTHER PUBLICATIONS

Konishi et al., "Diagnostic system to determine the in-service life of dry vacuum pumps," IEEE Proc. Sci. Meas. Technol. (1999), 146: 270–276.

*Primary Examiner*—Michael Nghiem
*Assistant Examiner*—Stephen J. Cherry
(74) *Attorney, Agent, or Firm*—Finnegan, Henderson, Farabow, Garrett & Dunner, L.L.P.

(57) ABSTRACT

An apparatus for predicting life expectancy of a rotary machine includes: a load recipe input module acquiring loading conditions of a rotary machine; a characterizing feature input module obtaining characterizing feature data of a rotary machine; and a life expectancy prediction module calculating life expectancy of the rotary machine in conformity with the loading conditions and the characterizing feature data.

22 Claims, 10 Drawing Sheets

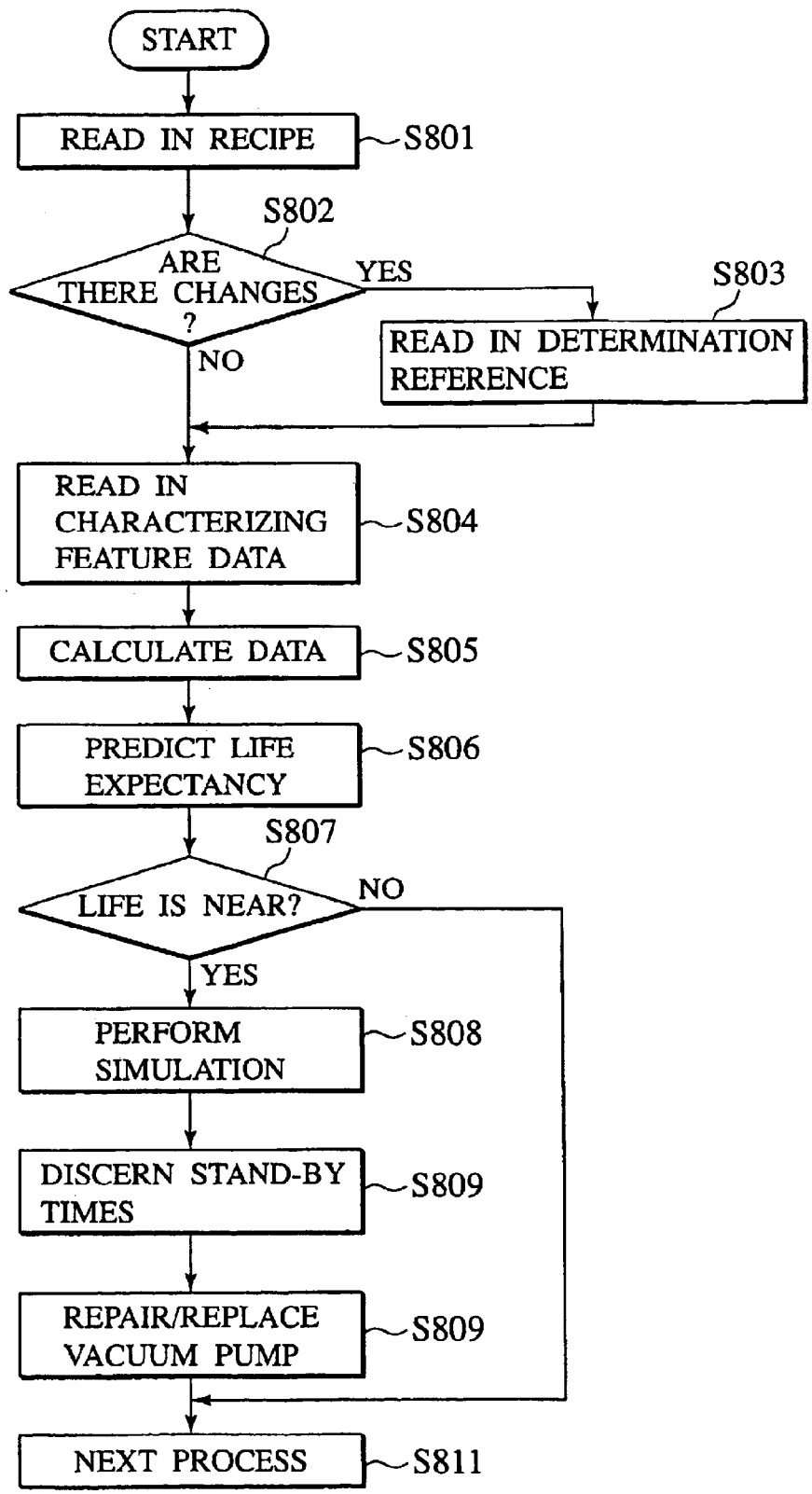

APPARATUS FOR PREDICTING LIFE OF ROTARY MACHINE AND EQUIPMENT USING THE SAME

This is a continuation of application Ser. No. 10/101,720, now U.S. Pat. No. 6,865,513, filed Mar. 21, 2002, which claims priority from application Ser. No. P2001-85736, filed on Mar. 23, 2001 in Japan, both of which are incorporated herein by reference.

CROSS REFERENCE TO RELATED APPLICATIONS

This application is based upon and claims the benefit of priority from prior Japanese Patent Application 2001-085736 filed on Mar. 23, 2001; the entire contents of which are incorporated by reference herein.

BACKGROUND OF THE INVENTION

1. Field of the Invention

The present invention relates to a rotary machine life expectancy prediction method, which measures life expectancy of a rotary machine, and a rotary machine repair timing determination method, which determines most appropriate repair timing for a rotary machine based on the life expectancy thereof.

2. Description of the Related Art

Failure diagnosis has become important for the sake of efficient semiconductor device manufacturing. Especially as the trend towards large item/small volume production of system LSI grows, an efficient yet highly adaptable semiconductor device manufacturing method has become necessary. It is possible to use a small-scale production line for efficient production of semiconductor devices. However, if the production line is merely reduced, the capacity utilization of manufacturing equipments drops. Accordingly, there are problems such as investment efficiency falling in comparison with large-scale production lines. To rectify this situation, there is method where a plurality of manufacturing processes is performed on one semiconductor manufacturing equipment. For example, in a low-pressure chemical vapor deposition (LPCVD) system, reactive gases introduced and reaction products differ depending on the types of film depositions. These are evacuated from the LPCVD chamber using a vacuum pump. Accordingly, the film deposition requirements differ and the formation situations for reaction products within the vacuum pump differ depending on the types of manufacturing process. Therefore, life expectancy of the vacuum pump is affected by the process history.

Normally, sensors for monitoring currents, temperatures, etc. during operation are attached to the vacuum pump. By doing so, whether a vacuum pump is malfunctioning can be observed by an operator, either by directly viewing them or from information on plotted graphs. However, since the currents and the temperatures change for the vacuum pump depending on the various process conditions, it is extremely difficult to measure life expectancy of the vacuum pump from these values, which change with every process.

If the vacuum pump should have an irregular shutdown during film deposition in LPCVD, then the lot being processed becomes defective. Moreover, excessive maintenance of the LPCVD system may become necessary due to microscopic dust caused by residual reactive gases, within the chamber and the piping used for gas introduction or vacuum evacuation. Implementation of such excessive maintenance causes manufacturing efficiency of the semiconductor device to drop dramatically.

If regular maintenance is scheduled with a margin of safety as a measure to prevent such sudden irregular shutdowns during the manufacturing process, the frequency for maintaining the vacuum pump may become astronomical. Not only does this increase maintenance cost, but it also invites a decrease in capacity utilization of the LPCVD system due to changing the vacuum pump, causing the manufacturing efficiency of the semiconductor device to drastically decline. To commonly use semiconductor manufacturing equipment for a plurality of processes, which is required for an efficient small-scale production line, it is desirable to accurately diagnose vacuum pump life expectancy and to operate the vacuum pump without having any waste in terms of time.

Previously, some methods of diagnosing vacuum pump life expectancy have been proposed. In Japanese Patent Application Laid-open No. 2000-283056, vacuum pump failure forecasting using a plurality of physical quantities such as amount of current, temperature or vibration for the vacuum pump is disclosed. In addition, it has been disclosed that operating conditions of the semiconductor manufacturing equipment such as operating time versus stand-by time must be considered to forecast vacuum pump failure. However, it is impossible for this to accommodate historical results of vacuum pump life expectancy in the case where a common semiconductor manufacturing equipment is used for a plurality of processes. It is noted that the objective of Japanese Patent Application Laid-open No. 2000-283056 lies in observing abnormalities of a vacuum pump, and not in forecasting life expectancy. Therefore, demands have been made for development of an apparatus and method for predicting vacuum pump life expectancy.

SUMMARY OF THE INVENTION

An apparatus for predicting life expectancy of a rotary machine includes: a load recipe input module configured to acquire loading conditions of a rotary machine; a characterizing feature input module configured to obtain characterizing feature data of a rotary machine; and a life expectancy prediction module calculating life expectancy of the rotary machine in conformity with the loading conditions and the characterizing feature data.

A manufacturing equipment using a rotary machine includes: a process controller configured to a production process; a rotary machine configured to process load of the production process; and a life expectancy prediction controller configured to calculate life expectancy of the rotary machine in conformity with the process recipe obtained by the process controller and characterizing feature data obtained from the rotary machine.

A method is provided comprising: reading a load recipe of loading conditions of a rotary machine; determining whether changes exist for the loading conditions by comparing the load recipe with an already existing load recipe for the process; employing an already existing determination reference if no changes exist for the load conditions, and reading in and employing a determination reference accommodating the process conditions if changes exist for the loading conditions instead of the already existing determination reference; processing time series data by reading in detected characterizing feature data for the rotary machine, which correspond to the determination reference; and calculating life expectancy of the rotary machine in conformity with the time series data and the determination reference.

A method is provided comprising: reading a load recipe of loading conditions of a rotary machine; determining whether changes exist for the loading conditions by comparing the load recipe with an already existing load recipe for the process; employing an already existing determination reference if no changes exist for the loading conditions, and reading in and employing a determination reference accommodating the process conditions if changes exist for the loading conditions instead of the already existing determination reference; processing time series data by reading in detected characterizing feature data for the rotary machine, which correspond to the determination reference; calculating life expectancy of the rotary machine in conformity with the time series data and the determination reference; finding stand-by times of the process in a time period until the calculated life expectancy is reached, by a semiconductor production simulator; and determining a stand-by time, of the found stand-by times, which least affects the process or a time including this stand-by time, to be the replacement or repair time of rotary machine.

BRIEF DESCRIPTION OF DRAWINGS

FIG. 12 is a flowchart showing a method of determining dry pump repair timing according the fifth embodiment of the present invention.

DETAILED DESCRIPTION OF THE INVENTION

Figure 1:
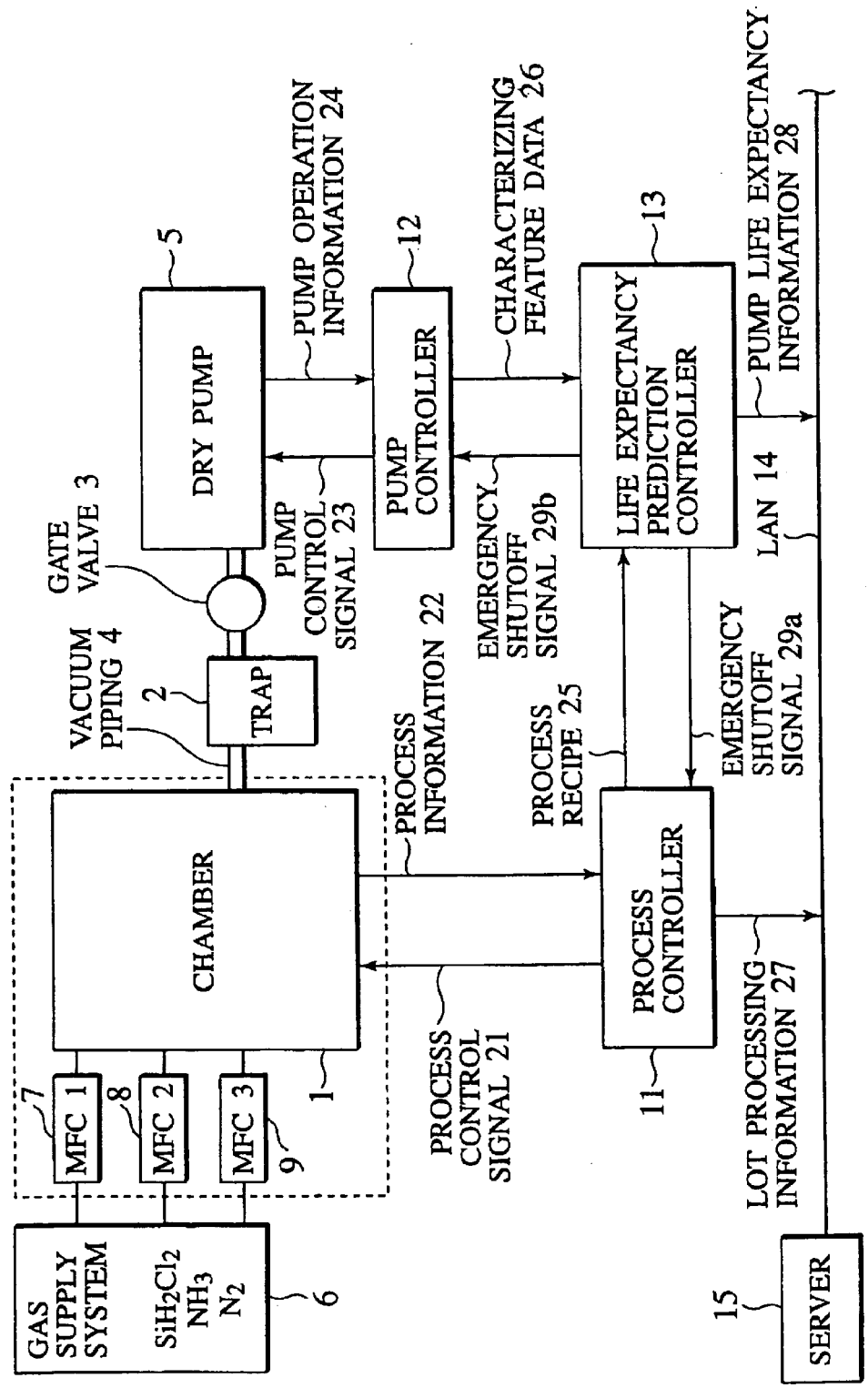
FIG. 1 is a schematic block diagram showing a configuration of a semiconductor manufacturing equipment according the first embodiment of the present invention.

Various embodiments of the present invention will be described with reference to the accompanying drawings. It is to be noted that the same or similar reference numerals are applied to the same or similar parts and components throughout the drawings, and the description of the same or similar parts and components will be omitted or simplified.

(First Embodiment)

As shown in FIG. 1, an LPCVD system used as a semiconductor manufacturing equipment according to the present invention encompasses a chamber 1, which has an air-tight structure capable of being evacuated, and is connected on the evacuation side of the chamber 1 to a dry pump 5, which is used as a vacuum pump, through a trap 2 and a gate valve 3 by a vacuum piping 4. A pump controller 12 controls the operation by outputting pump control signals 23 in the dry pump 5, and obtains pump operation information 24 of the dry pump 5. A plurality of gas piping are connected to the upstream side of the chamber 1, and this gas piping is connected to mass flow controllers 7, 8, and 9, respectively. The mass flow controllers 7, 8, and 9 are connected to a gas supply system 6, which supplies predetermined gases to be introduced to the chamber 1. A process controller 11 performs control and verification of, for example, pressures, temperatures and amounts of gas flow inside the chamber 1, in conformity with process control signals 21 and process information 22. A life expectancy prediction controller 13 is connected to the process controller 11 and the pump controller 12. Life expectancy of the dry pump 5 is predicted by reading process conditions for the chamber 1, for example a process recipe 25, which includes process conditions such as types of gases, gas flow rates, pressures, and substrate temperatures, from the process controller 11, and characterizing feature data 26, which includes, for example, characterizing feature amounts for the dry pump 5 such as currents, temperatures, and vibrations, from the pump controller 12.

Figure 2:
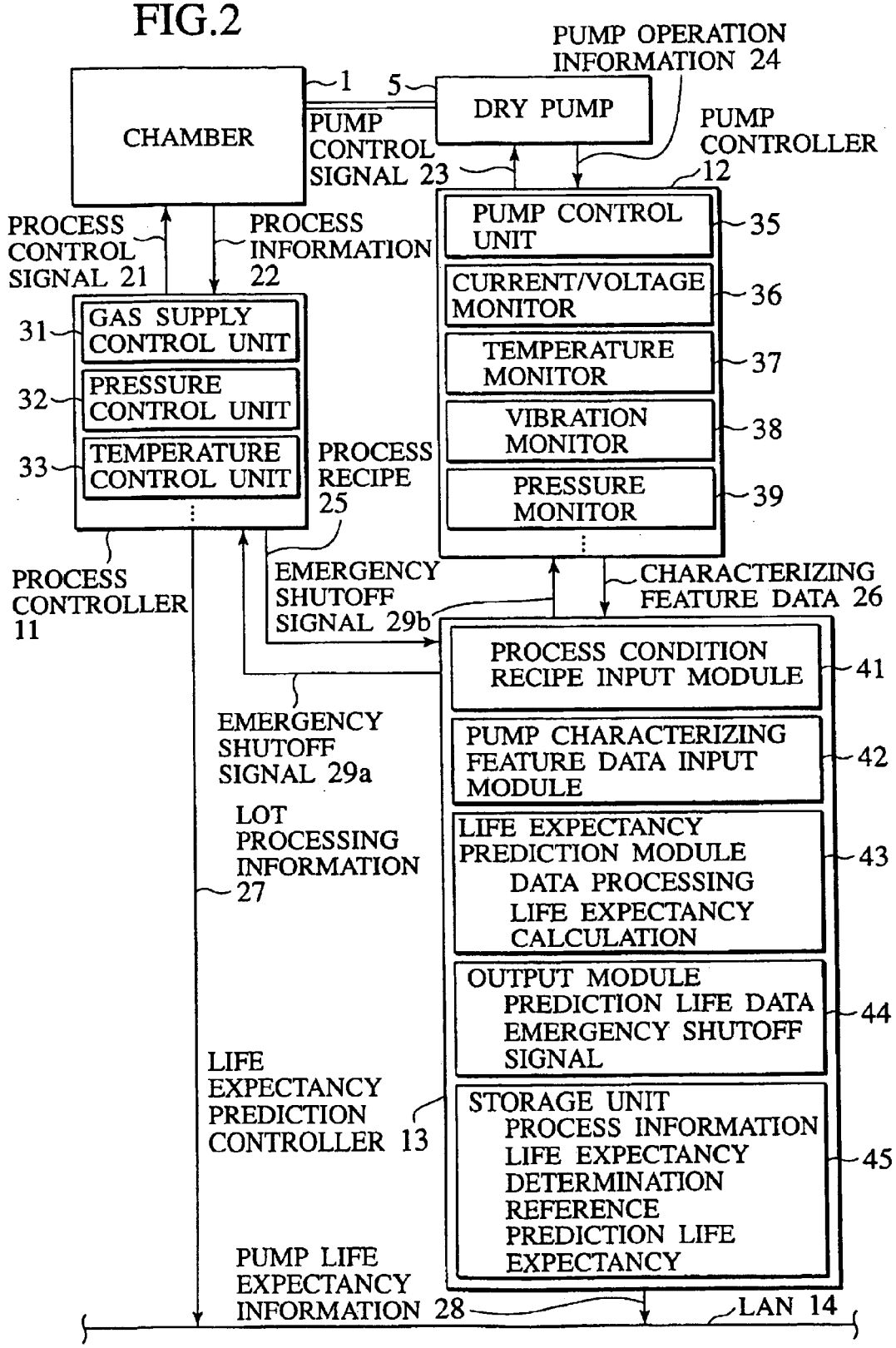
FIG. 2 is a schematic block diagram showing a configuration of a block of each controller composing an apparatus for predicting life expectancy according the first embodiment of the present invention.

Each controller consists of function blocks as shown in FIG. 2. The process controller 11 has a gas supply control unit 31, a pressure control unit 32, a temperature control unit 33, and the pump controller 12 has a pump control unit 35, a current/voltage monitor 36, a temperature monitor 37, a vibration monitor 38, a pressure monitor 39. The life expectancy prediction controller 13 has a process condition recipe input module 41, a characterizing feature data input module 42, a life expectancy prediction module 43, an output module 44, and a storage unit 45. The life expectancy prediction module 43 performs calculation of life expectancy of the dry pump 5, by reading a determination reference corresponding to the process recipe 25 from the storage unit 45, and processing statistically the characterizing feature data 26 for the dry pump 5. The process recipe 25 and the characterizing feature data 26 are read by the process condition recipe input module 41 and the characterizing feature data input module 42, respectively. The output module 44 outputs calculated pump life expectancy information 28 by the life expectancy prediction module 43 to a server 15. In addition, if it has become clear that the dry pump 5 is on the verge of failure, the output module alerts and sends emergency shutoff signals 29a and 29b to the process controller 11 and the pump controller 12, respectively. The storage unit 45 stores process information 22 of the process recipe 25, a corresponding life expectancy determination reference, and, also a calculated prediction life expectancy.

Including such an LPCVD system, various semiconductor manufacturing equipments are integrated as a computer integrated manufacturing system (CIM) through a local area network (LAN) 14 and administered in accordance with the CIM-based server (or host computer) 15.

The life expectancy prediction controller 13 can transmit life expectancy results to the CIM-based server 15 as pump life expectancy information 28 through the LAN 14. Here, in addition to the dry pump life expectancy information 28, the server 15 can read in film deposition process conditions as lot processing information 27 from the process controller 11. In addition, the life expectancy prediction controller 13 can send the emergency shutoff signals 29a, 29b to the process controller 11 and the pump controller 12 immediately before failure.

The life expectancy prediction controller 13, in response to the process conditions obtained from the process controller 11 can verify the operating conditions of the dry pump 5, and therefore is able to perform calculations for predicting life expectancy of the dry pump 5 during the process operation. In addition, the amount of precipitated material accumulated inside the dry pump 5 can be estimated by referencing the lot processing information 27, which is held in the server 15, and the life expectancy determination reference value can be updated through the process history. Moreover, the life expectancy prediction can also be used by constructively utilizing differences in process conditions, which are described later.

Using the LPCVD system shown in FIG. 1, in the case where depositing a silicon nitride ($Si_3N_4$) film, dichlorosilane ($SiH_2Cl_2$) gas and ammonia ($NH_3$) gas are respectively introduced via mass flow controllers 7 and 8 into the chamber 1 under low pressure conditions of approximately several 100 Pa. Inside the chamber 1, a silicon (Si) substrate is heated to approximately 650° C., and through the chemical reaction of the dichlorosilane and ammonia, a silicon nitride film is deposited upon the silicon substrate. In addition to generating the silicon nitride film, this reaction produces reaction by-products of ammonium chloride ($NH_4Cl$) gas and hydrogen gas. A reaction equation can be expressed as follows;

$$3\ SiH_2Cl_2 + 10\ NH_3 = Si_3N_4 + 6\ NH_4Cl + 6\ H_2 \quad (1)$$

Since hydrogen is a gaseous body, it can be easily purged from the dry pump 5. On the other hand, since the temperature of the silicon substrate within the chamber 1 is approximately 650° C. and it is under low pressure of approximately several 100 Pa at the time of formation, the ammonium chloride is also in a gas phase. Generally, the LPCVD system has the trap 2 for collecting solid reaction by-product material disposed between the chamber 1 and the dry pump 5. With this trap 2, it is impossible to completely collect the by-product material from the reaction under conditions of low pressure. Therefore, the reaction by-product that escapes from the trap 2 without being collected reaches the dry pump 5. Meanwhile, the not-reacted gas and the by-product material are cooled down. The pressure in the dry pump 5 suddenly increases from the low pressure conditions to normal atmospheric pressure due to the compression of the gas. While the by-product ammonium chloride is a gaseous body under high temperatures and low pressure, it solidifies as it cools and the pressure increases. Inside the dry pump 5, since the evacuated gas is subjected to repeated compression, cooled gaseous ammonium chloride throughout the evacuated gas begins to solidify and precipitate within the dry pump 5. There are cases where the precipitated material adheres and accumulates, and there are cases where the precipitated material falls off after a certain amount of it has precipitated, which depends upon portions inside the dry pump 5 where the ammonium chloride precipitates. In addition, the precipitation inside the pump, in particular between the rotor, which is a rotating body, and the casing thereof, causes reduction in clearance and clogging. In this case, an increase in the amount of a current and a power to the dry pump 5, and an increase in a temperature of the dry pump 5, or development of a vibration start to occur instantaneously. However, since smoothing and separation of the precipitated material is continuously occurring, the current level or the power level and the temperature return just as quickly to substantially normal levels and the vibration decreases. The dry pump 5 repeatedly has the reaction by-product materials precipitated as described above, which ultimately leads to its failure.

Figure 3:
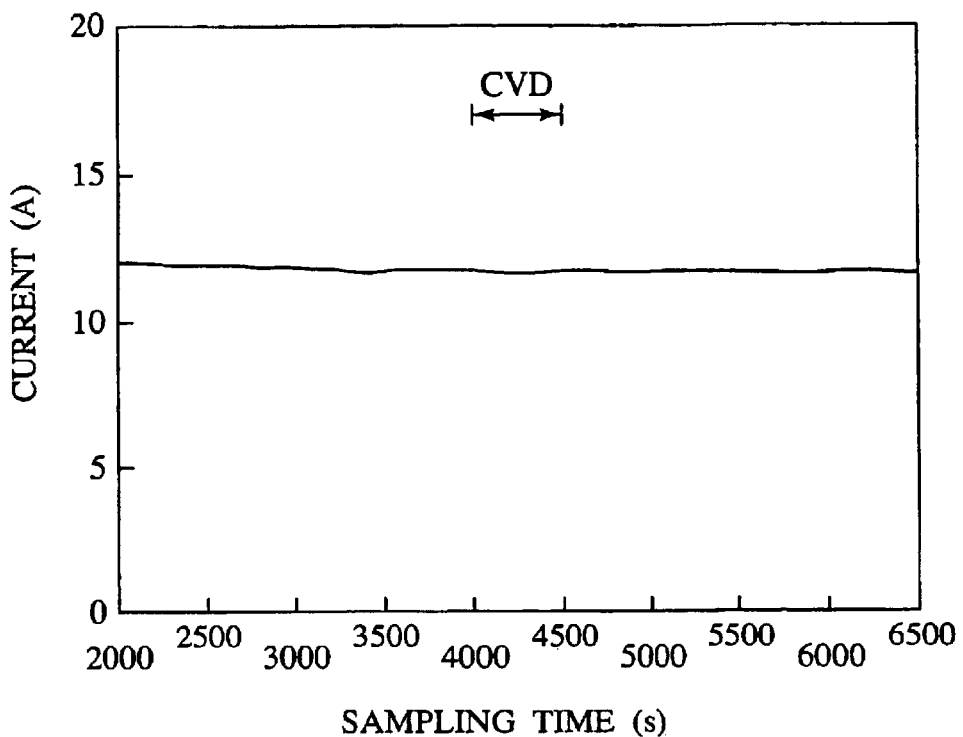
FIG. 3 is a graph showing an example of time varying current of a dry pump during process operation according the first embodiment of the present invention.
Figure 4:
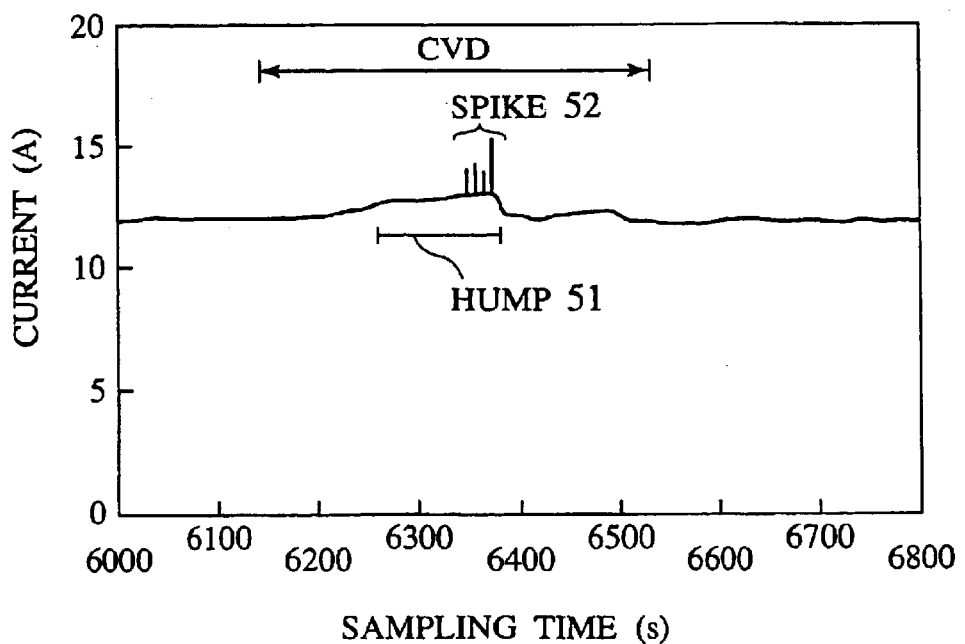
FIG. 4 is a graph showing another example of time varying current of a dry pump during process operation according the first embodiment of the present invention.

FIG. 3 is the time series data of the normal current levels in the early stage of utilization of the dry pump 5 when the number of times the LPCVD has been performed is still low. It can be understood from this that precipitation affecting the operation of the dry pump 5 has not developed. On the other hand, as the dry pump 5 develops wear and tear, just before failure, humps 51 and spikes 52 indicating abnormal increases in the current can be seen in the current level time log, as shown in FIG. 4. This shows that the precipitation is frequently developing over a wide range inside the dry pump 5. Such abnormal increases in the current begin to occur frequently as the amount of precipitated material accumulated inside the dry pump 5 increases.

The precipitated material continues to increase, and immediately before of the dry pump 5, a temporal increase in the current level or the power level, the temperature, the vibrations, etc. can be observed due to the accumulation of precipitated material. For example, the average level and the standard deviation of the current in the dry pump 5, which are calculated for a certain time period, continue to increase in accordance with the increase in precipitated material. Accordingly, by monitoring this level as a determination reference, life expectancy can be predicted by finding the increasing speed. The life expectancy determination reference of the dry pump 5 is determined by referencing failure data. However, as described hereto, in the case where a single semiconductor manufacturing equipment is applied to various processes, the determination reference of the life expectancy such as the average level and standard deviation of the current varies with every process condition. In addition, the increasing speed of characterizing feature data such as the average level, the standard deviation of the current, etc. depends on the process condition history. Therefore, in the first embodiment, a respective determination reference level is set for the characterizing feature data of every process condition, and life expectancy is calculated through the increasing speed of the characterizing feature data during the process. Moreover, in the case where the increasing speed of the characterizing feature data incidentally changes, not only is life expectancy recalculated, but the life expectancy determination reference level is also updated in line with this. Thus, it becomes possible for the life expectancy prediction to accommodate various process conditions, and also take the process history into consideration.

Figure 5:
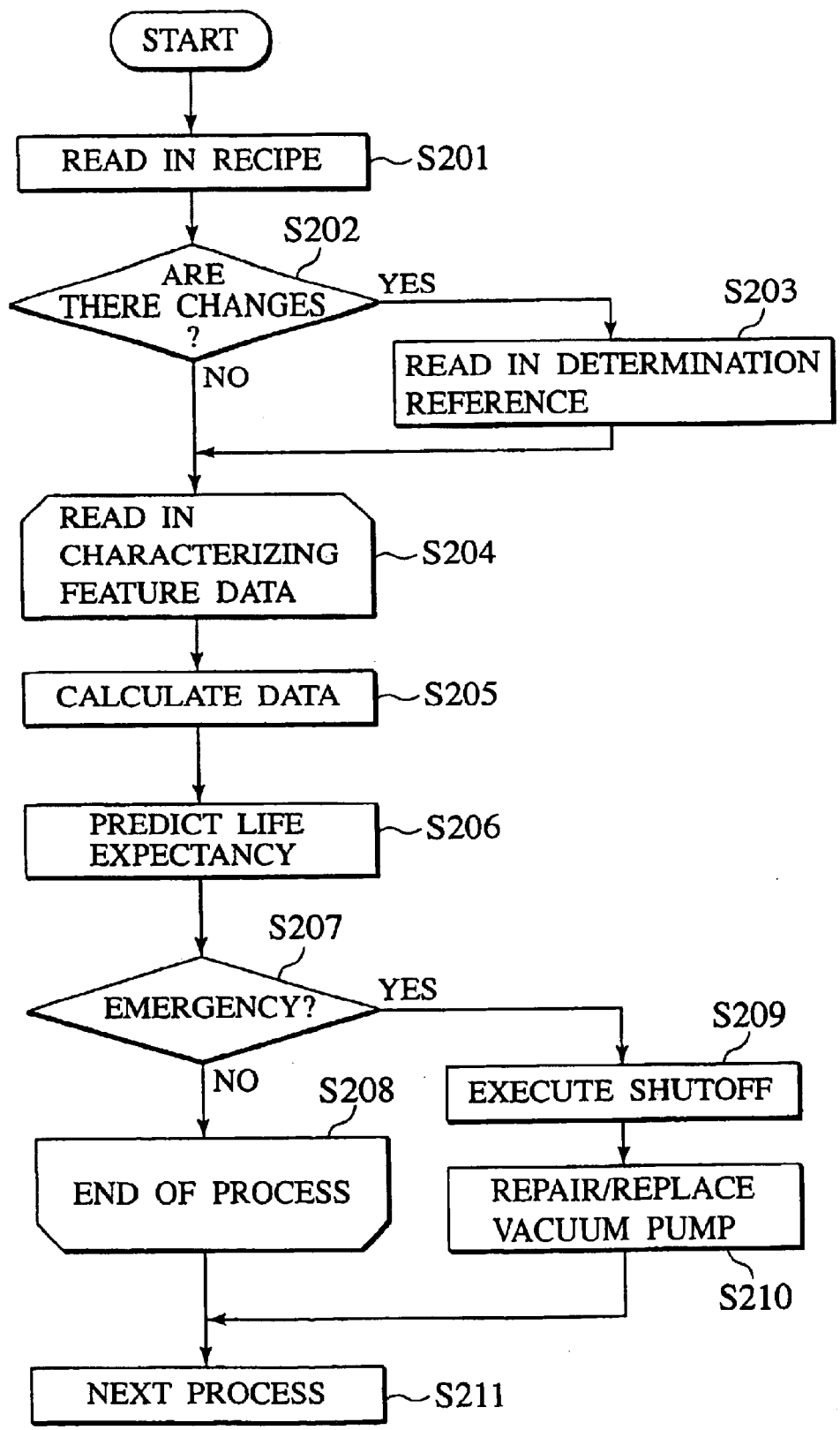
FIG. 5 is a flowchart showing a method of predicting dry pump life expectancy according the first embodiment of the present invention.

The case where the average level and the standard deviation of the current in the dry pump 5 are used as the characterizing feature data 26 for dry pump 5, the life expectancy prediction is described forthwith with reference to FIGS. 2 and 5. The determination reference of the dry pump life expectancy and the predicted life expectancy value are stored for every process condition in the storage unit 45 of the life expectancy prediction controller 13 as shown in FIG. 2.

(a) In Step S201 in FIG. 5, the process condition recipe input module 41 in the life expectancy prediction controller 13 reads in the process recipe 25 from the process controller 11, and discerns present process conditions of chamber 1, such as types of gases or flow rates of gases, pressures, and temperatures.

(b) In Step S202, it is determined whether there is any change in these present process conditions compared to earlier process conditions and if it is judged that there are no changes, then the presently set determination reference can be used without modification.

(c) When there has been a change in the process conditions, in Step S203, the life expectancy determination reference value set for every process condition is renewedly read in from the storage unit 45.

(d) In Step S204, the characterizing feature data input module 42 read in current levels from the characterizing feature data 26 of the dry pump 5.

(e) In Step S205, the life expectancy prediction module 43 calculates the average level and the standard deviation over a predetermined time interval, e.g. 10 seconds, so as to smooth out incidental changes.

(f) In Step S206, the life expectancy prediction module 43 calculates the increasing speed in conformity with the obtained average level and standard deviation of the current, and estimates the length of time until each determination reference is reached.

(g) In Step S207, it is determined whether, the predicted life expectancy is normal.

(h) When the predicted life expectancy is normal, it is determined whether the present process is finished, in Step S208. If it is not finished, the procedure is repeated to return in Step S204. If it is finished, then the dry pump 5 becomes in stand-by state until next process (Step S211).

(i) When it has been discerned, in Step S207, that the predicted life expectancy is not normal and the dry pump 5 is on the verge of failure, in Step S209, the emergency shutoff signals 29a, 29b are sent from the output module 44 to the process controller 11 and the pump controller 12. The process controller 11 and the pump controller 12, having received the emergency shutoff signals 29a, 29b, execute shutoff sequences of the chamber 1 and the dry pump 5.

(j) In Step S210, repair or replacement of the dry pump 5 is performed. Thereafter, the dry pump 5 will be in stand-by state until next process (Step S211).

The life expectancy prediction controller 13 can transfer the predicted length of time until the determination reference of the dry pump 5 is reached, as pump life expectancy information for every process condition to the server 15 via LAN 14, in Step S206. Based on the transferred data in the server 15, the pump life expectancy information for the dry pump 5 is updated; moreover, if the life expectancy determination reference is corrected in conformity with changes in the increasing speed of the characterizing feature data, the updated determination reference is returned to the restore unit 45. Naturally, instead of the server 15, storage and processing of this data may be performed on a separate host computer used as a database upon the LAN 14.

Moreover, when the average level and standard deviation of the current of the dry pump 5 during a process in the chamber 1, increases beyond expectation and it has become clear that the dry pump 5 is on the verge of failure, the emergency shutoff signal 29a is sent from the life expectancy prediction controller 13 to the process controller 11. The process controller 11, having received the emergency shutoff signal 29a, issues instructions to stop the supply of reactive gases to the chamber 1 and close the gate valve 3, and halts the process. This function allows the chamber 1 to be protected from contamination resulting from a sudden shutdown of the dry pump 5.

According to the first embodiment, since the determination reference for the characterizing feature data 26 of the dry pump 5 is prescribed for every process condition, the history throughout the life expectancy of the dry pump 5 can be analyzed, and response to changes in the determination reference according the process condition history is possible.

It is noted here that the life expectancy prediction controller 13 reads in the process recipe 25 for the type of gas, the flow rate of gas, etc. from the process controller 11, and discerns the process conditions; however, it is also possible for this reading in to be from the server 15 via LAN 14. Alternatively, a host computer used as a database can be used in place of the server 15. Here., the average and the standard deviation of the current level over time are used as the statistical method for the life expectancy prediction calculation in the life expectancy prediction controller 13; however, besides this, auto correlation coefficient according to auto covariance analysis, the lag width of the auto correlation coefficient, or likewise can be used. In addition, comprehensive determination using not only current levels but a plurality of characterizing feature data is also effective. In this case, if a Mahalanobis-Taguchi (MT) distance is used, the prediction can be made with even greater accuracy. Methods, which apply simple regression or multiple regression analysis to the increasing speed of the characterizing feature data, are effective in raising efficiency of the prediction.

(Modification)

Figure 6:
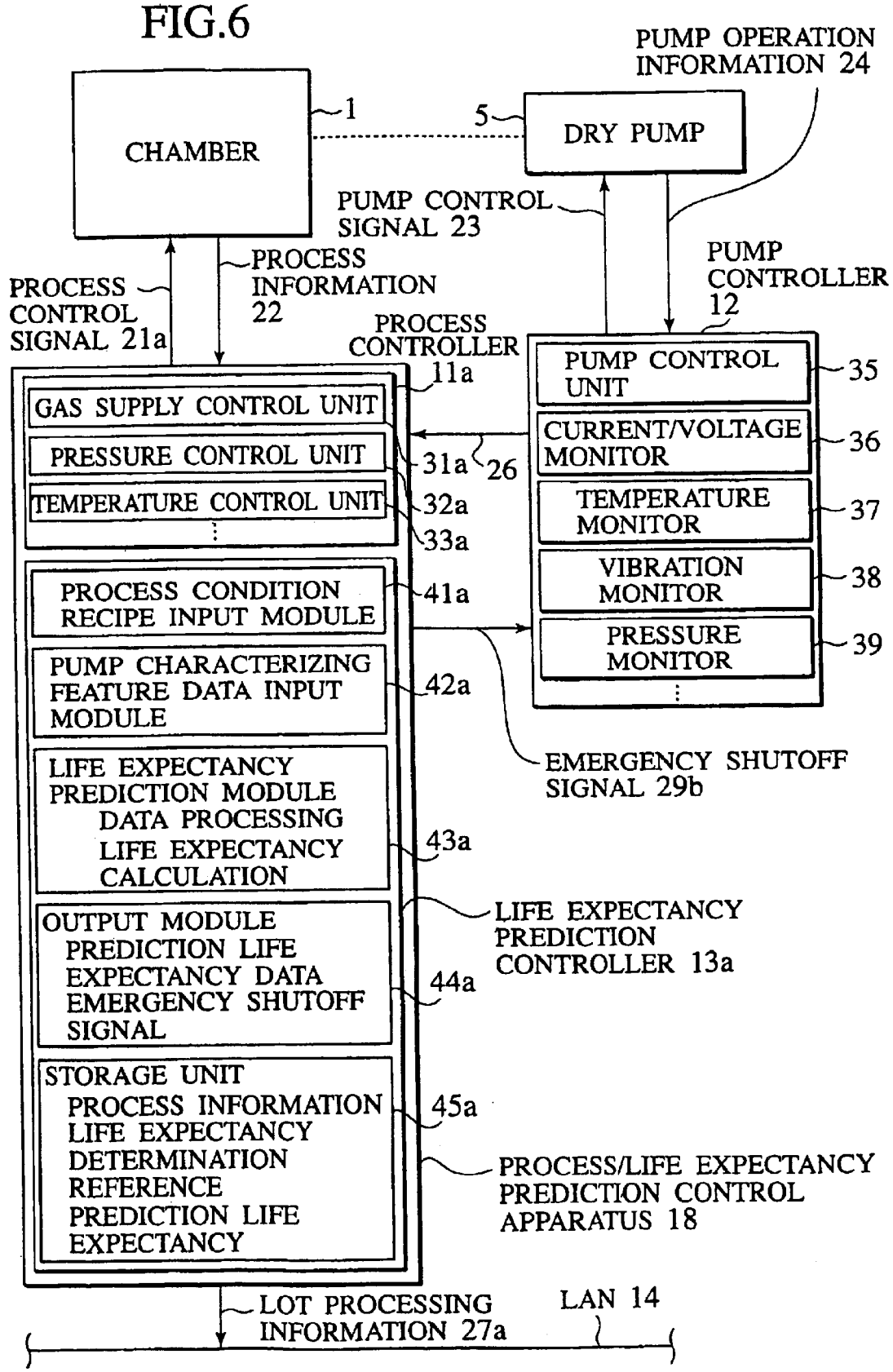
FIG. 6 is a block diagram showing a configuration of an apparatus for predicting life expectancy according a modified example of the first embodiment of the present invention.

In the first embodiment, the life expectancy prediction controller 13 is shown as an independent apparatus; however, in the alternate example, as shown in FIG. 6, a process/life expectancy prediction control apparatus 18 includes a process controller 11a and a life expectancy prediction controller 13a, together. Besides this, it is similar to the first embodiment and the repetitive description is thus abbreviated.

The process controller 11a has a gas supply control unit 31a, a pressure control unit 32a, a temperature control unit 33a. The life expectancy prediction controller 13a has a process condition recipe input module 41a, a characterizing feature data input module 42a, a life expectancy prediction module 43a, an output module 44a, and a storage unit 45a. The life expectancy prediction module 43a performs calculation of life expectancy of the dry pump 5, by reading a determination reference corresponding to the process recipe in the process controller 11a from the storage unit 45a, and processing statistically the characterizing feature data 26 for the dry pump 5. The process recipe and the characterizing feature data 26 are read by the process condition recipe input module 41a and the characterizing feature data input module 42a, respectively. The life expectancy prediction results can be transmitted as lot processing information 27a together with the process conditions to a server 15 via LAN 14 by an output module 44a. The storage unit 45a also stores the calculated life expectancy data. Process control signals 21a include an emergency shutoff signal from the output module 44a.

In response to the process conditions, the process/life expectancy prediction control apparatus 18, which is installed both the process controller 11a and the life expectancy prediction controller, can discern the operating conditions of the dry pump 5, and therefore is able to perform calculations for predicting life expectancy of the dry pump 5 during operation. In addition, the amount of precipitated material accumulated inside the dry pump 5, can be estimated by referencing the lot processing information 27a, which is held in the server 15, and the life expectancy determination reference value can be updated throughout the process history.

According to the modified example of the first embodiment, since the determination reference for the characterizing feature data 26 of the dry pump 5 is prescribed for every process condition, the history throughout the life expectancy of the dry pump 5 can be analyzed, and response to changes in the determination reference in conformity with the process condition history is possible.

In this modified example, the life expectancy prediction controller 13a is combined with the process controller 11a; however, a similar combination may also naturally be possible with the pump controller 12 attached to the dry pump 5.

(Second Embodiment)

An example where auto covariance analysis of the dry pump current is used as a method of predicting life expectancy of a semiconductor manufacturing equipment according the second embodiment of the present invention is described forthwith.

With the semiconductor manufacturing equipment life expectancy prediction method according to the second embodiment of the present invention, time series data of characterizing feature data such as currents, powers, inner pressures, vibrations, and temperatures obtained from the dry pump are analyzed, and stochastic techniques are used to predict dry pump failure. For example, if a relationship such as "if dry pump current is high at a certain point in time, current increases even after a predetermined lag width $\tau$ (data interval)" can be found, it is useful in dry pump life expectancy prediction.

To begin with, in order to analyze time series data of the characterizing feature data obtained from the dry pump, an assumption of constancy must be made. Simply put, constancy indicates that time series data at each time are realized with the same stochastic process, or the statistical properties of a stochastic process do not change over time. To have this constancy, conditions must be met where expected value $E[x(t)]=\mu$ remains unchanged over time, expected value $E[x(t)^2]=\mu^2$ remains unchanged over time, or in short the dispersion of $x(t)$ over time should not change, and further, expected value $E[x(t)x(\tau)]$ for an arbitrary $t, \tau$ is dependent on only the function of $t-\tau$, or in other words expected value $E[x(t)x(\tau)]$ is dependent solely on the difference in time. Namely, expected value $E[x(t)x(t+\tau)]$ becomes a function of lag width $\tau$, and expected value $E[x(t)]=\mu$ becomes fixed.

Therefore, the degree to which variable $x(t)$ and the variable $x(t+\tau)$ after lag width $\tau$ operate together, or the covariance of $x(t)$ and $x(t+\tau)$:

$$cov(x(t), x(t+\tau))=E[(x(t)-\mu)(x(t+\tau)-\mu)] \quad (2)$$

is a function of only lag width (data interval) $\tau$. This is because $$E[(x(t)-\mu)(x(t+\tau)-\mu)]=E[x(t)x(t+\tau)]-\mu^2. \quad (3)$$

This is called auto covariance function $C(\tau)$, and is defined as:

$$C(\tau)=E[(x(t)-\mu)(x(t+\tau)-\mu)]. \quad (4)$$

Moreover, autocorrelation coefficient $\rho_{xx}(\tau)$ is defined as:

$$\rho_{xx}(\tau)=C(\tau)/C(0). \quad (5)$$

$C(\tau)$ represents the strength of the connection between the data separated by lag width $\tau$.

In other words, when this amount is positively large, variable $x(t)$ and the variable $x(t+\tau)$ after lag width $\tau$ tend to behave in the same manner; on the other hand, if it is negatively large, it shows that variable $x(t)$ and variable $x(t+\tau)$ tend to behave in opposite manners. Also, if this amount is 0, it can be understood that variable $x(t)$ and variable $x(t+\tau)$ behave independent of each other.

Further by dividing $C(\tau)$ by $C(o)$, which is the normal dispersion, the value of $\rho_{xx}(\tau)$ can be standardized to be:

$$-1<\rho_{xx}(\tau)\leq 1. \quad (6)$$

Since the normal dispersion of $C(0)$ represents the strength of the relationship with itself, and not a correlation stronger than itself, $$|C(\tau)|\leq|C(0)|. \quad (7)$$

Eventually, as this auto correlation coefficient $\rho_{xx}(\tau)$ approaches 1, it can be determined that there is a strong relationship between variable $x(t)$ and variable $x(t+\tau)$, allowing the life expectancy of the semiconductor manufacturing equipment to be predicted. More specifically, the time series data for the characterizing feature data of the initial, non-deteriorated state of the dry pump is measured and made the reference time series data. The reference auto covariance function can be obtained from this reference time series data. Next, the time series data for the characterizing feature data of the dry pump during the process is measured, and from this the auto covariance function during the process can be obtained. The auto correlation coefficient can be found from the process and reference auto covariance function. If the auto correlation coefficient is near $|1|$, it can be determined that, regardless of whether the value is positive or negative, there is a strong relationship between the normal characterizing feature data of the dry pump; if it is near 0, then it can be determined that the correlation is weak and near to the end of its life expectancy.

Figure 7:
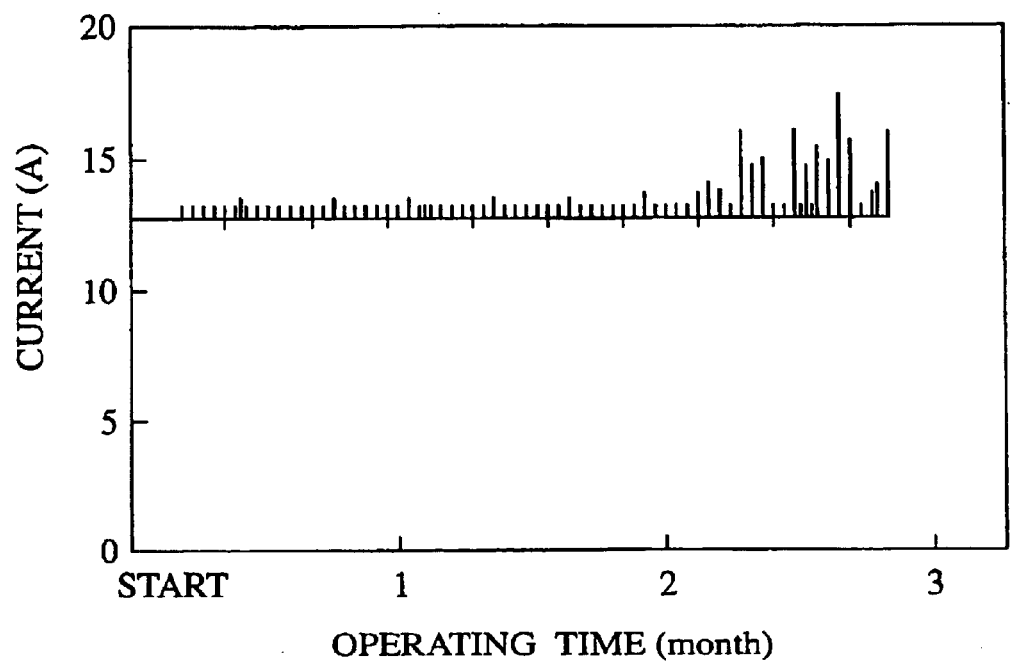
FIG. 7 is a graph showing an example of time varying current of a dry pump until failure according the second embodiment of the present invention.
Figure 8:
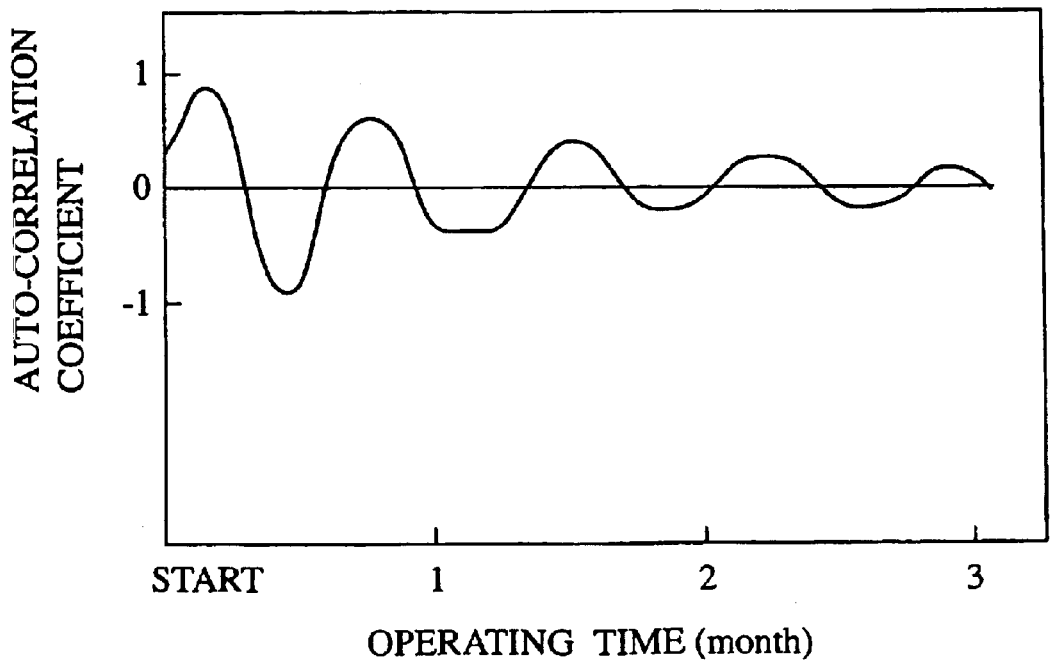
FIG. 8 is a graph showing auto covariance analysis results for the time varying current shown in FIG. 6.

As shown in FIG. 7, from the beginning to the two months period of the dry pump 5 usage, there are few temporary spikes in the current, but as the usage period progresses over two months until just before failure, as described above (refer to FIG. 4), large spikes in the current can be seen. On the other hand, steady changes in the current in the dry pump 5 are so small that it is almost humanly impossible to detect. Auto covariance analysis carried out based on this data gives the results shown in FIG. 8. Large, periodic changes in the auto correlation coefficient become manifest while the dry pump 5 is in normal working order, but as the dry pump 5 wears out as the usage period has become longer, these periodic changes become smaller and approach zero. Accordingly, if these periodic changes are tracked, the condition of the dry pump 5 can be diagnosed. The life expectancy prediction controller 13 performs diagnosis on the dry pump 5 based on this signal, and calculates the number of lots that can be processed during the lifespan of the dry pump 5 and registers this result in the server 15.

In the second embodiment, the current level is used as the characterizing feature data for the dry pump 5; however, other physical properties such as a power level, a temperature, a vibration, or a sound spectrum may be used. In addition, it is also effective to predict the life expectancy of the dry pump 5 by using not only just the one physical property of current level, but various physical properties comprehensively as the determination reference for the dry pump 5.

(Third Embodiment)

Figure 9:
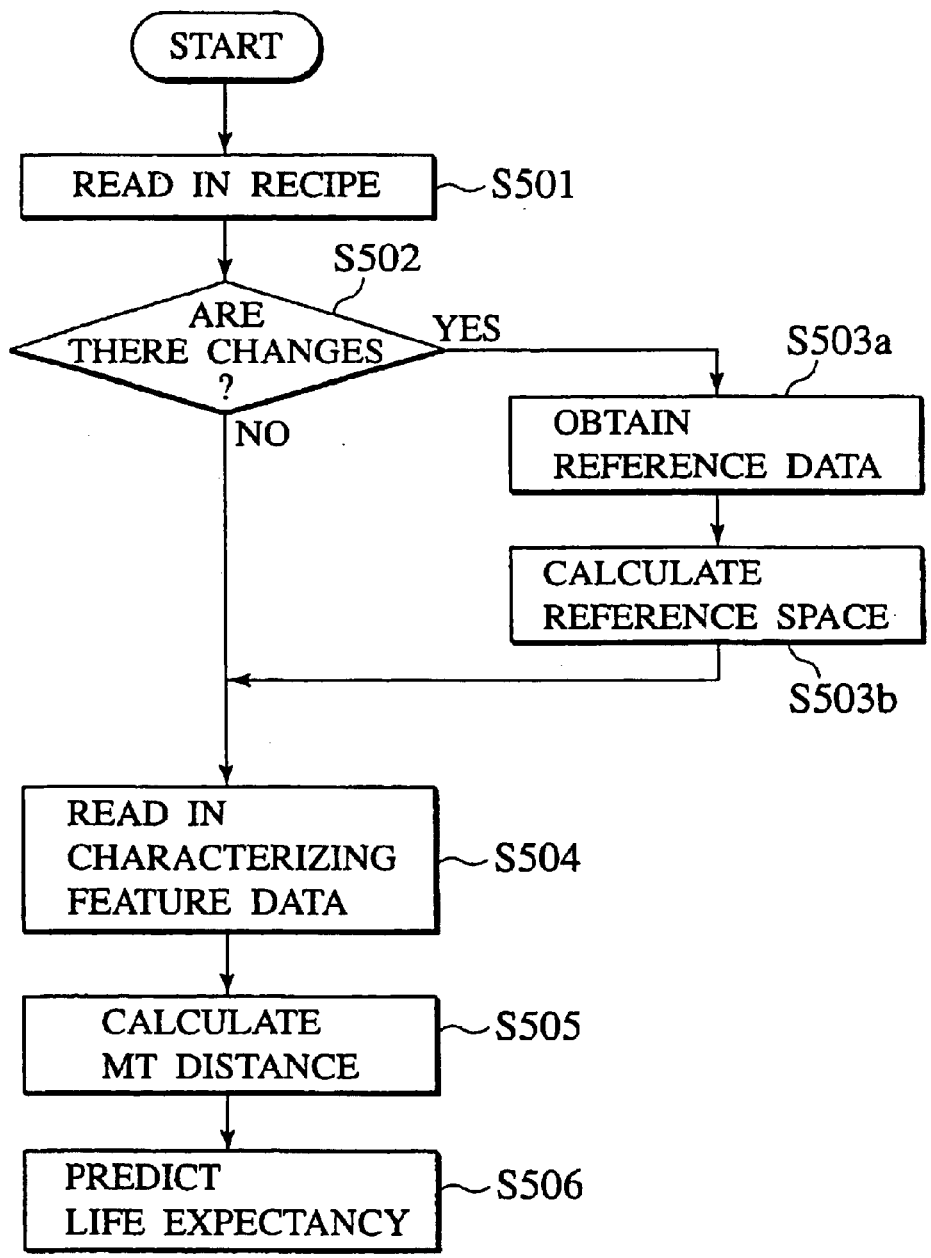
FIG. 9 is a flowchart showing a method of predicting dry pump life expectancy according the third embodiment of the present invention.

Description is made with reference to the example of the LPCVD system used in the first embodiment, depicted in FIGS. 2 and 9. In the case of using not only just the one physical property of current level, but various physical properties comprehensively as the characterizing feature data for the dry pump 5, life expectancy of the dry pump 5 can be effectively predicted utilizing a Mahalanobis-Taguchi (MT) distance.

It is necessary to find an inverse matrix obtained from the reference data during normal conditions, or a reference Mahalanobis space, in order to find a MT distance with the life expectancy prediction controller 13. For example, the auto correlation coefficient of the auto covariance with respect to the time series data of the current, the temperature, and the vibration of the dry pump 5 may be used as the data forming the reference space. The inverse matrix of the correlation matrix derived from the current, the temperature, and the vibration data is then found. Calculation for finding the inverse matrix from this correlation matrix can be performed in the life expectancy prediction controller 13; alternatively, it may be performed in the server 15 or another computer in the CIM system. This reference Mahalanobis space may be set beforehand for every process condition; however, there is also a chance it may change depending on the history of the various process conditions.

(a) In Step S501 in FIG. 9, the process condition recipe input module 41 in the life expectancy prediction controller 13 reads in the process recipe 25 from the process controller 11, and discerns present process conditions of the chamber 1, such as types of gases or flow rates of gases, pressures, and temperatures.

(b) In Step S502, it is determined whether there has been a change in the process conditions. When there is no change in the process conditions found, the inverse matrix of the present reference (Mahalanobis) space continues to be used.

(c) In Step S503a, when a change in the process conditions has been discerned from the process recipe 25 in Step S502, current, temperature, and vibration data of the dry pump 5 is obtained for a predetermined number of rotations, for example 20 rotations, and with it the reference data is reconfigured to find a new inverse matrix in Step S503b.

(d) Thereafter, in Step S504, the characterizing feature data input module 42 read in the characterizing feature data 26 of the current levels, the temperatures and the vibrations of the dry pump 5, which are obtained during processing, for a predetermined number of rotations.

(e) In Step S505, the life expectancy prediction module 43 calculates the inverse matrix from the characterizing feature data 26 of the current levels, the temperatures and the vibrations of the dry pump 5, which is set as the verified Mahalanobis space. The MT distance is then found from this verified Mahalanobis space and the reference space found earlier, and calculation of the life expectancy of the dry pump 5 is performed.

(f) In Step S506, the life expectancy prediction module 43 performs the life expectancy prediction for the dry pump 5. When the dry pump 5 is normal, the verified Mahalanobis space is analogous to the reference space and the MT distance shows a value of around 1. A larger value for the MT distance shows that the verified space and the reference space have deviated, and usually an MT distance of approximately 10 is determined to be abnormal. Accordingly, if an MT distance of 10 is made the life expectancy determination reference for the dry pump 5, the dry pump life expectancy can be predicted from the MT distance calculated at each measurement point or the speed of the increase in the MT distance.

The predicted results are stored in the storage unit 45 by the output module 44, and also, registered as the pump life expectancy information 28 for each process condition in the server 15 via LAN 14.

According to the third embodiment, when predicting the life expectancy of the dry pump 5, a correlation matrix of the various physical properties is obtained by taking into consideration conditions of the dry pump 5 and the MT distance can be used to determine life expectancy of the dry pump 5.

(Fourth Embodiment)

Since the average value and the standard deviation of the characterizing feature data such as currents, powers, temperatures, vibrations, and sounds change correspond to the various process conditions, a method that accommodates this has been described in the above-mentioned embodiment. In the life expectancy prediction method according to the fourth embodiment, a method, which is simplified further, is described.

Figure 10:
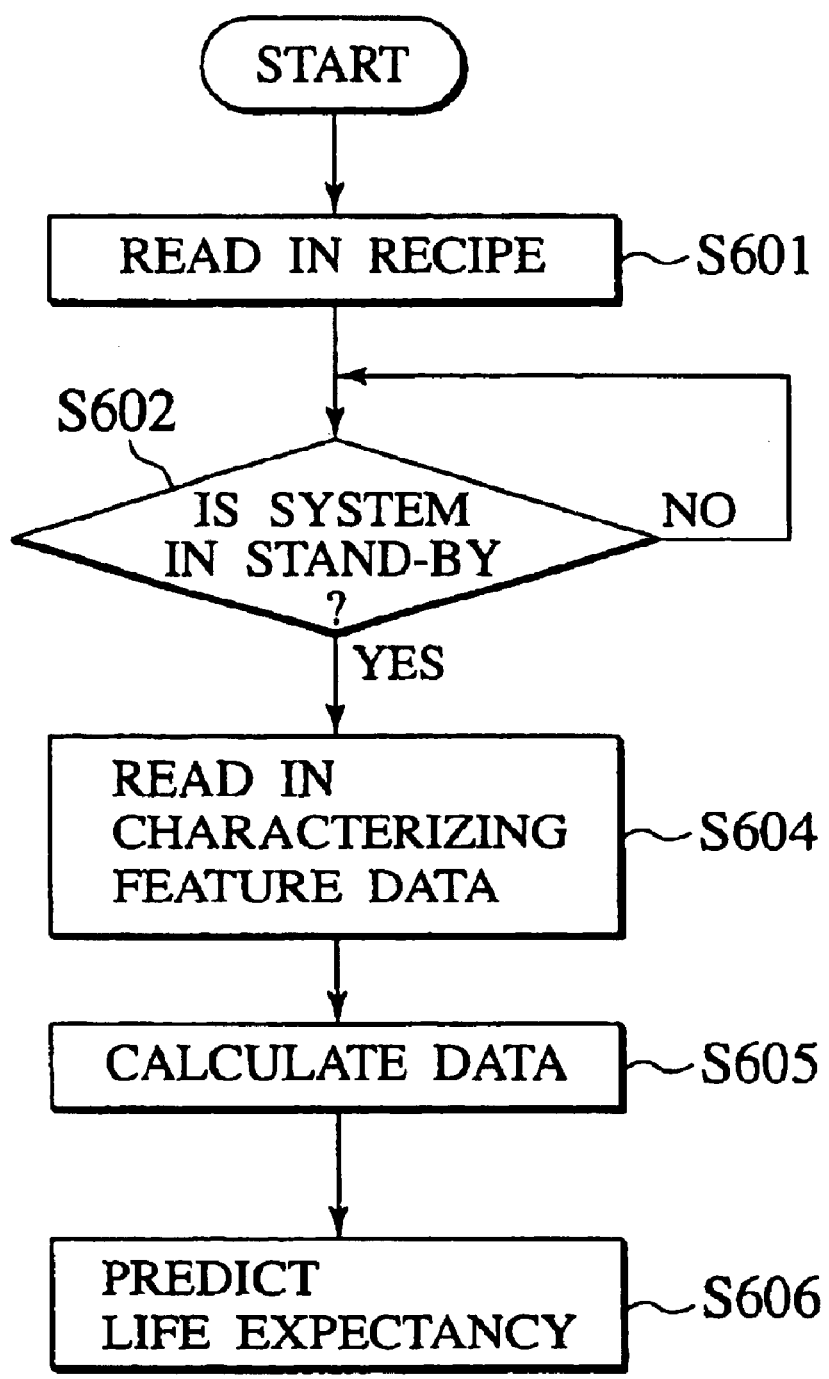
FIG. 10 is a flowchart showing a method of predicting dry pump life expectancy according the fourth embodiment of the present invention.

If the semiconductor manufacturing equipment were to be roughly divided, it would be said to have two states: the operational state where the manufacturing process is being performed and the stand-by state between when a lot is taken out and the next lot is inserted. The above-mentioned first through third embodiments are examples where the life expectancy prediction of the dry pump 5 is performed during operation of the semiconductor manufacturing equipment. During operation of the semiconductor manufacturing equipment, the characterizing feature data such as the current level is taken during an active process since the not-reacted gas and the reaction by-products are being carried from the chamber 1 to the dry pump 5. On the other hand, during the stand-by state, since the chamber 1 is being purged by inactive gas such as nitrogen ($N_2$) gas, the load on the dry pump 5 is low, and amount of abnormal material being attached is low, processing is relatively static. The fourth embodiment is an example where the life expectancy prediction of the dry pump 5 is performed while the semiconductor manufacturing equipment is on stand-by. In this description, FIGS. 10 and 2 are used and the current level of the dry pump 5 is used as the characterizing feature data for the life expectancy determination reference.

(a) In Step S601, the process condition recipe input module 41 in the life expectancy prediction controller 13 reads in the process recipe 25 from the process controller 11, and discerns the present process conditions of the chamber 1 such as types of gases, flow rates of gases, chamber temperatures, and pressures.

(b) In Step S602, it is discerned whether the LPCVD system is in an operational state or a stand-by state.

(c) When it has been discerned that the LPCVD system is in a stand-by state, in Step. S604, the characterizing feature data input module 42 read in the current level from the characterizing feature data 26 of the dry pump 5.

(d) In Step S605, the life expectancy prediction module 43 calculates the increasing speed in conformity with the average level and the standard deviation of the current obtained, and estimates the length of time until each the life expectancy determination reference read in from the storage unit 45 is reached.

(e) In Step S606, the life expectancy prediction module 43 predicts the life expectancy from the calculated length of time until the determination reference values of the dry pump 5 are reached. The predicted results are stored in the storage unit 45 by the output module 44, and also, registered as the pump life expectancy information 28 for each process condition in the server 15 via LAN 14. Based on the transferred data in the server 15, the pump life expectancy information 28 for the dry pump 5 is updated, and moreover, if the life expectancy determination reference is corrected in conformity with changes in the increasing speed of the life expectancy, the updated life expectancy determination reference is returned to the storage unit 45 of the life expectancy prediction controller 13.

Even if the dry pump 5 is on stand-by, the characterizing feature data 26 of the dry pump 5 changes for every process due to the historical results of the internally precipitated material. Even if on standby, the level of current in the dry pump 5 increases for every process in conformity with these historical results, and it is possible to measure the life expectancy of the dry pump 5 through analysis of the increase speed of the characterizing feature data 26.

Here, as a stand-by life expectancy prediction for the dry pump 5, instead of the constantly flowing purge with nitrogen gas, it is also effective to change the nitrogen gas flow rate. The nitrogen gas flow rate is changed and the amount of change in the average level and the standard deviation of the current in the dry pump 5 corresponding to the change in the gas flow rate is measured. When almost at failure, the authors have found that the change in the average level and the standard deviation of the current tends to decrease in comparison with the change in the flow rate of nitrogen gas. Accordingly, it is possible to predict the life expectancy of the dry pump 5 from the change in the average level and the standard deviation of the current compared to the change in the nitrogen gas flow rate. In this manner, it is easier to accurately determine the life expectancy since life expectancy prediction testing during stand-by can be performed under the conditions that are not applicable during operation.

The life expectancy prediction can be performed by intermittently introducing inactive gas and measuring the change in load features for the dry pump 5. In this case, the ease with which the attached material is smoothed and detached, can be studied. As usage of the dry pump 5 gets longer, the ability to smooth and detach the attached material drops. This change can be picked up as changes in the current level of the dry pump 5, allowing the life expectancy prediction to be made for the dry pump 5.

In addition, a cleaning gas is sometimes used to remove attached material within the chamber 1 during stand-by. The change of the current level in this procedure can also be use for prediction. Moreover, even more accurate prediction can be attained by intermittently introducing and halting inactive gas after introducing the cleaning gas, and measuring the change in the load features of the dry pump 5.

Effective testing can also be performed by introducing reactive gas, instead of inactive gas. Generally, when introducing inactive gas, changes in the average level and the standard deviation of the load thereof may become difficult to measure since the load of the dry pump 5 is small; in such a case, the use of a reactive gas is effective.

Unlike during process operation, the same conditions can be employed to simplify the life expectancy prediction in the case where the life expectancy prediction is performed for the dry pump 5 while the semiconductor manufacturing equipment is on stand-by. In addition, since this stand-by is controlled through CIM, the sequence for performing life expectancy testing can be compiled into an operating program for semiconductor manufacturing equipment and executed.

(Fifth Embodiment)

Figure 11:
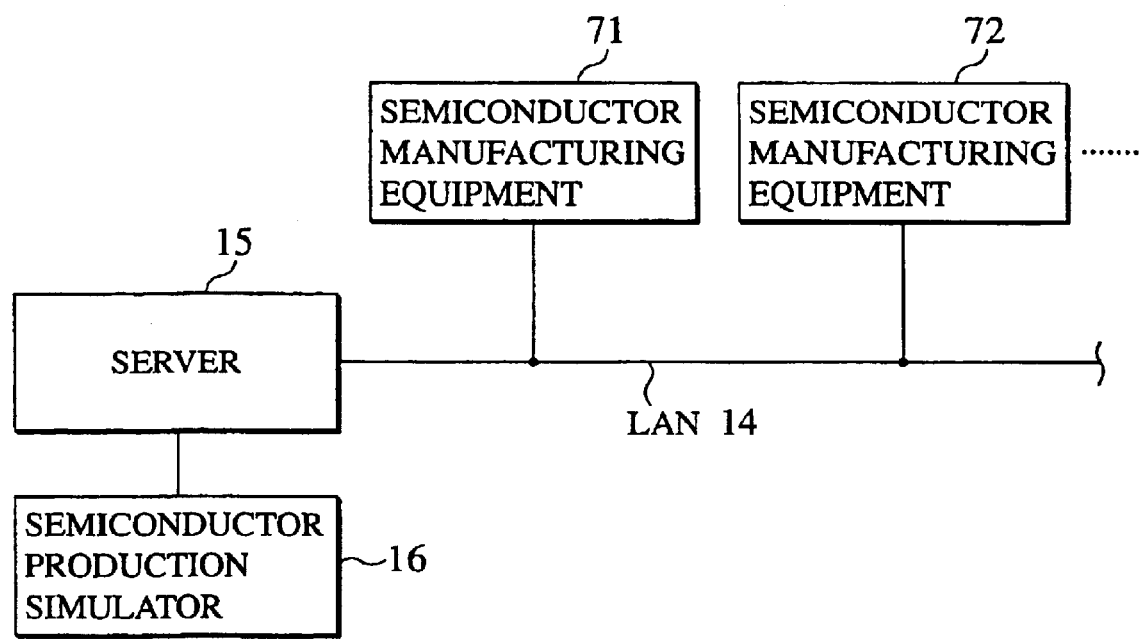
FIG. 11 is a block diagram showing a structural example of a semiconductor production system for a method of determining dry pump repair timing according the fifth embodiment of the present invention.

As shown in FIG. 11, a semiconductor production system comprises a configuration where a plurality of semiconductor manufacturing equipments 71, 72, . . . are connected to a LAN 14, which is connected to a server 15, and a semiconductor production simulator 16 is further connected to the server 15.

Here, assuming a small-scale production line where approximately 100 lots are produced per month, there will be somewhere around 50 semiconductor manufacturing equipments. The semiconductor production simulator 16 configures a virtual factory having the same equipment configuration and scale as this production line using ManSim, which is commercially available software. Data from the manufacturing equipment deployed at the actual production plant such as an equipment performance, a processing time, and a frequency of and time required for repair or quality control (QC) is input to ManSim, and conditions are constructed inside the computer that are completely identical to those of the actual plant. In addition, the semiconductor manufacturing equipments 71, 72, . . . have respective configurations similar to that of the semiconductor manufacturing equipment shown in FIG. 1.

Next, a method of determining timing of repairs according to the fifth embodiment of the present invention is described forthwith using the flowchart shown in FIG. 12, and the life expectancy prediction controller depicted in FIG. 2.

(a) In Step S801 in FIG. 12, the process condition recipe input module 41 in the life expectancy prediction controller 13 reads in the process recipe 25 from the process controller 11, and discerns present process conditions of the chamber 1, such as types of gases, flow rates of gases, pressures, and temperatures.

(b) In Step S802, it is determined whether there is any change in these present process conditions compared to earlier process conditions and if it is judged that there are no changes, then the presently set determination reference can be used without modification.

(c) When there has been a change in the process conditions, in Step S803, the life expectancy determination reference value set for every process condition is renewedly read in from the storage unit 45.

(d) In Step S804, the characterizing feature data input module 42 read in current levels from the characterizing feature data 26 of the dry pump 5.

(e) In Step S805, the life expectancy prediction module 43 calculates the average level and the standard deviation over a predetermined time interval, e.g. 10 seconds, so as to smooth out incidental changes.

(f) In Step S806, the life expectancy prediction module 43 calculates the increasing speed in conformity with the obtained average level and the standard deviation of the current, and estimates the length of time until each determination reference is reached. The predicted results are stored in the storage unit 45 by the output module 44, and also, registered as the pump life expectancy information 28 for each process condition in the server 15 via LAN 14.

(g) In Step S807, it is determined whether the life expectancy of the dry pump 5 is predicted drawing near (h) When the predicted life expectancy is normal, then the dry pump 5 becomes in stand-by state until next process (Step S811), as usual.

(i) Based on that life expectancy prediction, in Step S807, if there is a dry pump for which life expectancy is drawing near, such as that of the semiconductor manufacturing equipment 71, the server 15 causes the semiconductor production simulator 16 to operate and carry out simulation. More specifically, using ManSim, the time period until failure is found. Then the repair time period with the least effect on semiconductor production during that time period is found using simulation. Having the least effect on the production means that pump replacement is performed when there is no lot coming that should be processed into the semiconductor manufacturing equipment 71, or in other words, when this equipment is on stand-by. Naturally, as is to be expected, there are cases where the length of stand-by time is shorter than required for the pump replacement. In such cases, if the pump replacement is performed during the longest of the stand-by times, it will have the least effect on production.

(j) It is assumed that it has become clear from the simulation results, in Step S809, that there are, for example, 1 hour, 3 hour, and 5 hour stand-by periods before failure of the dry pump 5 in the semiconductor manufacturing equipment 71. The time needed to replace the dry pump 5, including letting the temperature of the semiconductor manufacturing equipment 71 drop and bringing the temperature back up after the replacement, requires approximately 6 hours.

(k) Therefore, the 5 hour long stand-by period is earmarked, and in Step S810, the dry pump replacement or repair is performed. As a result, the time that the lot is held up can be limited to only 1 hour.

According to the fifth embodiment, the semiconductor production simulator 16 finds the stand-by time periods for the semiconductor manufacturing equipment through simulation, and determines the stand-by period or a time period including this stand-by period with which the semiconductor production is least affected and sets it as timing of the dry pump repair; accordingly, the length of time the semiconductor manufacture lot is held back can be minimized and the effect on the semiconductor production is kept to a minimum.

(Other Embodiments)

It is noted that the present invention is not limited to the above-mentioned embodiments, and may also be embodied in various other forms without departing from the spirit or essential characteristics thereof, in specific configuration, function, operation or result. Specifically, the life expectancy prediction method is not limited to a dry pump or a semiconductor manufacturing equipment, but may have wide application to a rotary machine, such as a compressor, a motor, or to a manufacturing equipment using such rotary machine. Furthermore, the dry pump life expectancy prediction method is not limited to a dry pump of a semiconductor manufacturing equipment, but may have wide application to an entire semiconductor manufacturing equipment including a dry etching system and a sputtering system. In addition, the vacuum pump is not limited to being a dry pump, but may also include any variety of pumps such as a turbo-molecular pump, a mechanical booster pump, or a rotary pump.

Various modifications will become possible for those skilled in the art after receiving the teachings of the present disclosure without departing from the scope thereof.

Accordingly, the present invention naturally includes various embodiments not specifically mentioned herein. Accordingly, the technical scope of the present invention may be limited only by the inventive features set forth by the scope of the patent claims deemed reasonable from the above description.

What is claimed is:

1. An apparatus for predicting a life of a rotary machine comprising:

a process condition recipe input module configured to acquire loading conditions of a rotary machine according to a target process recipe from among a plurality of process recipes provided by a process controller that controls the loading conditions, the process recipes including various kinds of gases;

a characterizing feature input module configured to obtain characterizing feature data of the rotary machine; and a life expectancy prediction module configured to calculate life expectancy of the rotary machine in conformity with a determination reference corresponding to the target process recline and the characterizing feature data, the determination reference determined by referencing failure data of the rotary machine.

2. The apparatus of claim 1, wherein the loading conditions are defined by process conditions of a chamber where gas is introduced and a semiconductor manufacturing process is performed, and the rotary machine is a vacuum pump.

3. The apparatus of claim 2, wherein the characterizing feature data include one of voltage, current, power, temperature, vibration, and sound of the vacuum pump.

4. The apparatus of claim 2, wherein calculation of the life expectancy uses time series data of the characterizing feature data.

5. The apparatus of claim 4, wherein calculation of the life expectancy uses any one of average value, standard deviation, auto correlation coefficient, lag width of an auto correlation coefficient, and statistical analysis value of a Mahalanobis-Taguchi distance of a limited time segment in the time series data for characterizing feature data.

6. The apparatus of claim 4, wherein the calculation of life expectancy is derived from speed of change of the statistical analysis value, a simple regression or multiple regression analysis.

7. The apparatus of claim 2, wherein the calculated life expectancy is fed to a local area network.

8. The apparatus of claim 2, wherein based on the calculated life expectancy, an emergency shutoff signal for the process is provided.

9. The apparatus of claim 2, wherein the process conditions include kind of the gas and flow rate of the gas.

10. The apparatus of claim 1, wherein the determination reference is updated in conformity with a change in the characterizing feature data.

11. Manufacturing equipment comprising:

a process controller configured to control a production process based on a target process recipe from among a plurality of process recipes, the process recipes including various kinds of gases;

a rotary machine configured to process a load of the production process; and a life expectancy prediction controller configured to calculate life expectancy of the rotary machine in conformity with a determination reference corresponding to the target process recipe obtained by the process controller and characterizing feature data obtained from the rotary machine, the determination reference determined by referencing failure data of the rotary machine.

12. The manufacturing equipment of claim 11, wherein the process recipe defines process conditions of a chamber where gas is introduced and a semiconductor manufacturing process is performed, and the rotary machine is a vacuum pump.

13. The manufacturing equipment of claim 12, wherein the process conditions include kind of the gas and flow rate of the gas.

14. The manufacturing equipment of claim 12, wherein the characterizing feature data include one of voltage, current, power, temperature, vibration, and sound of the vacuum pump.

15. The manufacturing equipment of claim 12, wherein calculation of the life expectancy uses time series data of the characterizing feature data.

16. The manufacturing equipment of claim 15, wherein the calculation of the life expectancy uses any one of average value, standard deviation, auto correlation coefficient, lag width of an auto correlation coefficient, and statistical analysis value of a Mahalanobis-Taguchi distance of a limited time segment in the time series data for the characterizing feature data.

17. The manufacturing equipment of claim 15, wherein the calculation of life expectancy is derived from speed of change of the statistical analysis value, a simple regression or multiple regression analysis.

18. The manufacturing equipment of claim 12, wherein the calculated life expectancy is fed to a local area network.

19. The manufacturing equipment of claim 12, wherein based on the calculated life expectancy, an emergency shutoff signal for the process is provided.

20. The manufacturing equipment of claim 12, wherein the process controller and the life expectancy prediction controller are installed in a same case.

21. The manufacturing equipment of claim 11, wherein the life expectancy prediction controller is supplied with a plurality of process recipes.

22. The manufacturing equipment of claim 11, wherein the determination reference is updated in conformity with a change in the characterizing feature data.

* * * * *